United States Patent [19]
Trujillo et al.

[11] Patent Number: 5,918,313
[45] Date of Patent: Jul. 6, 1999

[54] SLED SUIT

[76] Inventors: Jenny Trujillo, 54 Wright Ave., Jersey City, N.J. 07306; Gina Reilly, 61 Bailey Hollow Rd., Morris Township, N.J. 07960

[21] Appl. No.: 08/975,026

[22] Filed: Nov. 20, 1997

[51] Int. Cl.⁶ .................................................. A41D 13/00
[52] U.S. Cl. .......................................... 2/79; 2/69; 2/227
[58] Field of Search ............................. 2/69, 79, 46, 80, 2/82, DIG. 3, 227, 242, 114, 275, 901, 902, 243.1; 112/440

[56] References Cited

U.S. PATENT DOCUMENTS

| | | | |
|---|---|---|---|
| 742,346 | 10/1903 | McNeil | 2/275 |
| 1,468,072 | 9/1923 | Ogle | 2/69 |
| 2,738,512 | 3/1956 | Winer | 2/80 |
| 3,166,762 | 1/1965 | Winkworth | 2/80 |
| 3,201,800 | 8/1965 | McHugh | 2/80 |
| 4,124,903 | 11/1978 | Shaw | 2/79 |
| 4,657,266 | 4/1987 | Böhme | 2/80 X |
| 5,052,052 | 10/1991 | Gilford et al. | 2/69 X |
| 5,063,923 | 11/1991 | Peroni | 2/79 X |
| 5,068,920 | 12/1991 | Bray | 2/79 X |
| 5,511,245 | 4/1996 | Hayes | 2/79 |

*Primary Examiner*—Gloria M. Hale
*Attorney, Agent, or Firm*—Stroock & Stroock & Lavan LLP

[57] ABSTRACT

A sled suit for sliding comprises a torso portion having a head opening, a pair of sleeves coupled to the torso portion, a leg portion coupled to the torso portion. The torso portion, the pair of sleeves and the leg portion are made of durable waterproof material with a low coefficient of friction.

8 Claims, 3 Drawing Sheets

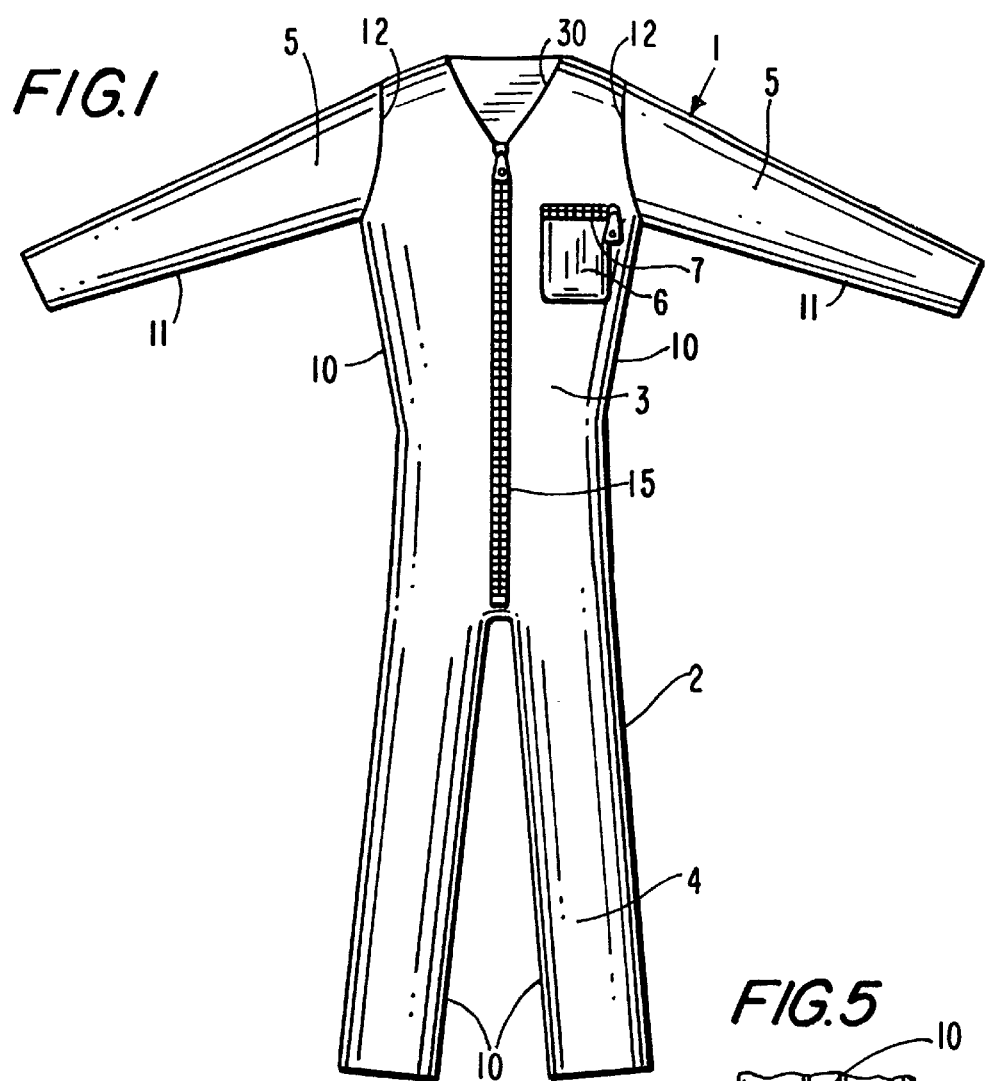
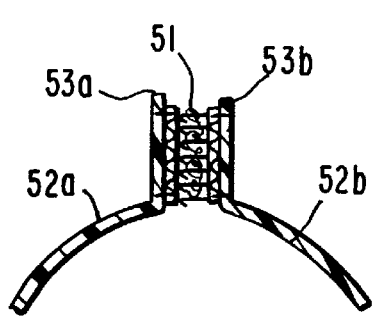
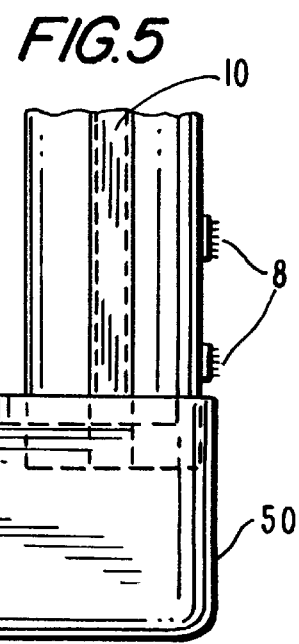

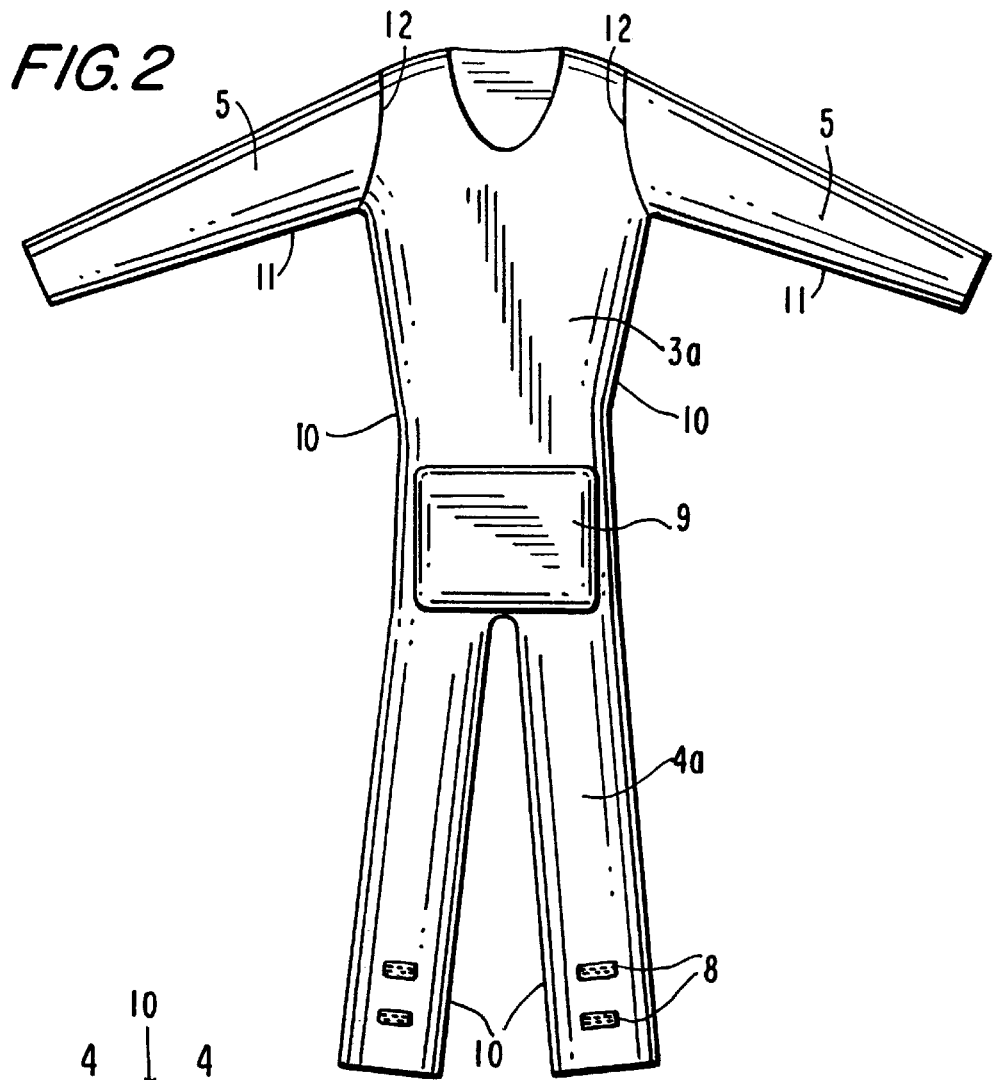
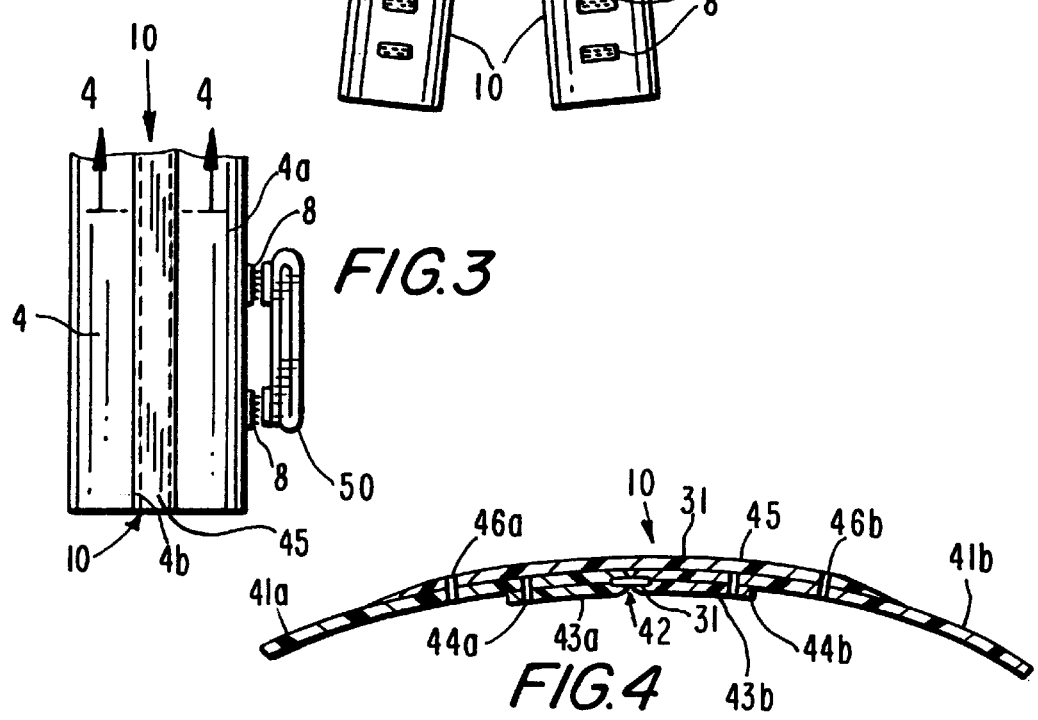

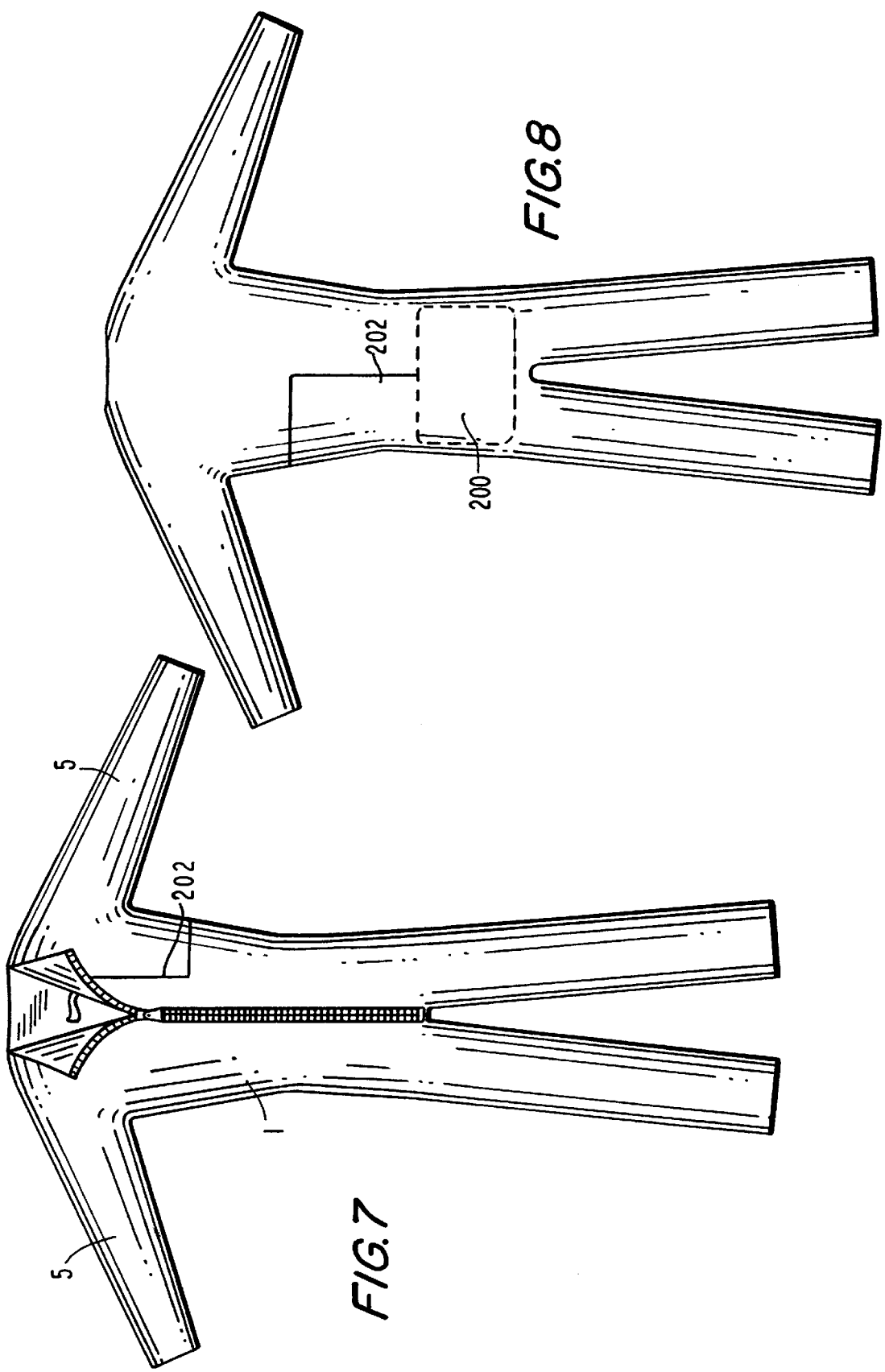

SLED SUIT

BACKGROUND OF THE INVENTION

The present invention relates generally to outdoor clothing, and in particular to clothing which permits the user to slide downhill with his or her own body without carrying a sled.

It has been a popular activity for children and adults to slide on hills during snowfalls. The traditional ways to enjoy downhill sliding include toboggans, skis, sleds, make shift sleds utilizing boxes with durable bottoms, or plastic sleds carried by the users. The thrill of sliding down a hill has been appreciated for centuries, however the thrill of conventional sledding has been tempered by the fact that the sledder is tethered to the cumbersome sled device and does not feel the increased play value of freely sliding down a hill. Further more, all sledders have to climb back to the top of the hill on their own. The uphill climb is the strenuous part of this activity. The uphill climb becomes more tortuous when people have to carry a sled, which is bulky, heavy and reduces the mobility of the user.

On the other hand, conventional clothing has been unsuitable for sliding. After a few rounds of sliding, the footwear, pants, shirts and other garments of the slider tend to get wet because of active contact between slider's clothing and the thick snow. Additionally, to climb back to the top of hill, requires better traction, so people usually wear sneakers or hiking boots which allow snow to get inside and cause an annoying feel for the climbers.

Waterproof suits have been developed in recent years. They keep the wearer warm in the snow. However they are too bulky and have too many discontinuities in their surfaces or have too much drag against the snow to allow a user to obtain sufficient speed in sliding. Nor do they have sufficient padding to protect the user. They are nothing more than clothing to keep the wearer warm while using conventional sliding equipment such as skis or a sled.

To solve the problem of carrying a bulky sled while maintaining dryness and slidability, some products have been introduced. One of the products is a SnowShort, which is a short pants for use over conventional snow proof clothing. A foam-padded PVC seat is attached to the outside surface of the portion which contacts with the seat of the user. There are a number of stripes arranged on the PVC seat acting as runners to facilitate sliding. By putting on such SnowShort the user is able to slide downhill just by sitting down and without carrying a sled. However this SnowShort allows the user to slide downhill only on their seat with their legs in the air, which leads to a unstable position during the slide. Other parts of the body will unavoidably touch the snow reducing the sliding effect. To prevent the body from getting soaked, users must wear waterproof coat and pants, which reduce the mobility of the user. Furthermore, the use of the SnowShort is limited to one position (sitting) In one direction, along the axis of the stripes.

Accordingly, it is desirable to provide a suit which overcomes the disadvantages of the prior art described above.

SUMMARY OF THE INVENTION

Generally speaking, in accordance with the present invention, a sled suit facilitating a user to slide downhill using his or her own body as a sled is provided. The sled suit includes a torso portion connected to a first arm, second arm, first leg and second leg. The suit is made of a unitary construction, but in a preferred embodiment the first and second arms and first and second legs are connected to the torso section by seams which streamline the surface of the sled suit reducing discontinuities.

The sled suit is made of durable waterproof slippery material such as vinyl, nylon or Teflon® coated thread and the like.

At a seam, interconnecting two pieces of material are connected in a butting relationship by an interconnecting stitch such that an excess flap so that each piece of material extends within the suit. The flaps are anchored to the suit by respective secondary stitches stitched in a direction parallel to the interconnecting stitch so that each excess flap is sewed against the respective piece of material. An overstitch reinforcing fabric is disposed along the seam formed between two pieces of material to cover the seam and secondary stitches. With this two-layer-reinforced arrangement, the joining between pieces of material becomes very durable. Furthermore, the discontinuity of the seam is smoothed to a lesser discontinuity by the gradual discontinuity of the anchored edges of the reinforcing fabric. Accordingly, the seamless sewing provides the sled suit with a streamlined surface which reduces the resistance force caused by contact with snow and durability which allows more active movement, and thus facilitates the user in downhill slide.

Detachable boots, gloves and hood are provided on the sled suit so that a more streamlined sled suit is provided during the downhill slide without sacrificing the mobility when going uphill. The boot comprises two panels of material with low coefficient of fraction identical to the material used in the suit with the upper edge left open and others stitched together. An attaching means, such as a Velcro® hook fastener, is provided on the upper edge of the boot. After completing a slide, the user is able to detach the boots and allows the shoes under the sliding boots to make contact to the ground.

An aerodynamic pouch is also included in the sled suit. A cushion is selectively disposed in the pouch. The shape of the pouch is uniform with the torso seat such that discontinuities are reduced and a smooth sledding is obtained.

It is an object of the present invention to provide a suit which allows sledding in any of a variety of positions.

Another object of the present invention is to provide a suit which improves the mobility of the wearer during climbing up a hill and the freedom of the wearer sliding down the hill.

Another object of the present invention is to provide a suit which reduces the impact upon the body of the wearer during the downhill slide.

Still other objects and advantages of the invention will in part be obvious and will in part be apparent from the specification and drawings.

The invention accordingly comprises an apparatus embodying features of construction, combination of elements and arrangement of parts to be exemplified in the constructions hereinafter set forth and the scope of the invention indicated in the claims.

BRIEF DESCRIPTION OF THE DRAWINGS

For a fuller understanding of the invention, reference is had to the following description taken in connection with the accompanying drawing, in which:

FIG. 1 is a front elevational view of a sled suit constructed in accordance with a first embodiment of the invention;

FIG. 2 is a rear elevational view of the sled suit of FIG. 1;

FIG. 3 is a partial side elevational view of the sled suit of FIG. 1, showing the boot arrangement and reinforcing structure of the present invention;

FIG. 4 is a cross sectional view taken along line 4—4 of FIG. 3;

FIG. 5 is a partial side elevation view of the sled suit, showing the detachable boot according to the present invention;

FIG. 6 is a cross sectional view along line 6—6 of the FIG. 5;

FIG. 7 is a front elevational view of a sled suit constructed in accordance with a second embodiment of the invention; and FIG. 8 is a rear elevational view of the sled suit of FIG. 7.

DESCRIPTION OF THE PREFERRED EMBODIMENT

The sled suit according to the present invention will now be described referring to a preferred embodiment shown in attached drawings. As seen in the figures, the sled suit generally indicated as 100 according to the present invention comprises a torso portion 1 for receiving an upper body of the user, and legs portion 2 for receiving the leg of the user. Right and left sleeves 5 are connected to either side of torso portion 1 and communicate with torso portion 1 to receive the respective arms of the user. Leg portion 2 and sleeves 5 are preferably open ended to let feet and hands extend therethrough. A collar head opening 30 is formed in torso portion 1 to allow a head to extend therethrough. A pocket 6 may be sewn on the torso portion 1 for convenience of the wearer. A zipper 7 is provided on the upper edge of the pocket 6 to secure the contents in the pocket 6 during activities. A zipper 15 is provided on torso portion 1. Zipper 15 extends from a head opening 30 through the torso portion 1 to the crotch of the leg portion 2 and serves as the open-close structure for taking on/off the sled suit.

Torso portion 1, sleeves 5, and leg portion 2 are made of waterproof material with a low coefficient of friction such as vinyl, nylon, Teflon® coated threads or the like. Sled suit 100 may be formed as a unitary construct. However, to maintain the streamlined outer contours each sled suit 100 would need to be custom tailored to fit snugly and prevent bunching of material during use. Therefore, in a preferred embodiment for mass production sled suit 100 is formed as a front half 3 and a back half 3a joined along seams 10, 11. To reduce bunching of materials and facilitate movement sleeve 5 may be formed as separate sections and joined to torso portion 1 along seams 12.

Seams themselves may provide discontinuities which affect sliding within the suit. Therefore the preferred sled suit having seams utilizes streamlined seams on all the joining between adjacent pieces of the material. More specifically, all the joined seams including the side seam 10 between the front part 3 and back part 3a of the torso portion 1, between a front part 4 and rear part 4a of the leg portion 2, the under seam 11 at the under edge of the sleeves 5, and the seam 12 between the torso portion 1 (part 3 and 3a) and the sleeves 5 is formed as a layered structure to smooth out discontinuities.

Reference is now made to FIG. 3 and FIG. 4 in which the layered structure according to the present invention is depicted and the detailed structure of the "seamless" connection between adjacent portions is described in connection therewith. The connecting structure of seam 10 for connecting the front and rear parts 4, 4a of the pants portion 2 is shown. This structure is used by way of example and seams 11 and 12 are constructed in a similar manner.

The seam fastening structure includes two adjacent pieces of material 41a, 41b abuttedly arranged along their length so that a respective flap 43a, 43b extends along a fold line 31a, 31b from each piece of material 41a, 41b within body suit 100. An interconnecting stitch 42 couples material 41a to 41b along fold lines 31a, 31b to form seam 10. Flap 43a, 43b are folded about respective fold lines 31a, 31b away from each other to be flush against material 41a, 41b. Flaps 43a, 43b are affixed to respective pieces of material 41a, 41b by secondary stitches 44a, 44b. Secondary stitches 44a, 44b extend along material 41a, 41b parallel to seam 10. An overstitch reinforcing fabric 45 is provided over the seam 10 to cover seam 10 and stitches 44a, 44b and extends along the length of seam 10. Overstitches 46a and 46b extending in a direction substantially parallel to seam 10 to affix overstitch reinforcing fabric at the edges of the overstitch reinforce fabric. In a preferred embodiment overstitch reinforcing fabric may be tapered at the edges to streamline the structure and reduce discontinuities. Additionally, TFE coated threads may be used as stitches. With this two-layer-reinforcing structure, the seam formed between pieces of material becomes very durable and streamlined. Further because of the selection of TFE coated threads, the waterproof property of the seamless construction is improved. Accordingly, the construction provides the sled suit with a streamlined surface which reduces the resistance force caused by the contact with snow and durability which allows more active movement, and thus facilitates the user in a downhill slide. It is noted that stitches are used to connect the various pieces of material, however the material may be connected by staples, adhesives or the like.

Further referring to FIG. 2 and FIG. 3, a seat cushion arrangement and additional features of sled suit are now described. According to the present invention, a seat cushion is provided on the sled suit for the protection and comfort of the user. A pouch 9 is provided on rear portion 4a and extends substantially coextensive with the seat of a wearer. Pouch 9 may be placed on the interior or exterior of sled suit 10. Pouch 9 is selectively closeable at one end by a zipper, Velcro® fastener or the like and receives padding therein. A foam rubber padding wrapped by thick vinyl may be packed into the pouch as the padding. Pouch 9 if formed integrally with the material at seat 9 is formed as a wedge providing an aerodynamic surface at the seat aiding in sliding.

More accessories such as detachable boots, gloves and hood are provided on the sled suit made of the same low coefficient of friction material so that a more streamlined sled suit is obtained during the downhill slide without sacrificing the mobility when going up. After completing a slide, the user is able to detach the boots to allow the users snow boots to make contact with the ground.

Referring to FIG. 5 and FIG. 6, a boot 50 comprises either a unitary open topped enclosure or an enclosure or an made of two panels 52a, 52b formed of low coefficient material identical to the suit. In a preferred embodiment the two panels 52a, 52b are shaped essentially as a rectangle and all edges, except the upper edge 53a, 53b (above the foot), are stitched together with the corresponding one. The upper edge 53a, 53b is left open so that an attaching structure, such as a Velcro® fastener 51, is provided on the upper edge of the boot. Additional hook fastener 8 are provided on the lower rear ends of the leg portions 4a pants so that the Velcro® fastener 51 on the upper edge of the boot 50 can be attached thereto to store boot 50 after sliding to expose the user's walking boots, having better traction, to return uphill. As a result to return boot 50 to its sliding position boot 50 can be removed from fastener 8 and placed over the foot as in FIG. 5 lowering any drag which may result from the hiking boot during sliding. To expose the hiking boot boot 50 is folded to expose either fastener 51, or some other like fastener, to attach to fastener 8 in a stored position.

Similarly a hood 80 is affixed to collar 30, and is also made of the low coefficient of friction material to prevent the users head from providing discontinuities. Hood 80 can also be anchored to torso portion 1, when not in use, by a Velcro® fastener. Similar, a glove can be affixed to sleeve 5 in a manner similar to boot 50 and leg portion 2.

Reference is now made to FIG. 7 and FIG. 8, in which a second embodiment of the present invention is depicted. In this embodiment, the seat cushion 9 is formed as a inflatable pad which is hidden inside the sled suit at the position adjacent to the seat. Like numerals indicates like structure. An inflatable pad 200 is arranged on the inside of sled suit. An inflating tube 202 extends from the inflatable pad 200 to a point where the wearer's mouth is accessible to tube 202 for inflating pad 200. Tube 202 snakes along the inner surface of torso portion 1. Tube 202 is equipped with a removable stopper to prevent inadvertent deflation.

It will thus be seen that the objects set forth above, among those made apparent from the preceding description are efficiently attained and, since certain changes may be made in the construction set forth, without departing from the spirit and scope of the invention, it is intended that all matter contained in the above description and shown in the accompanying drawings shall be interpreted as illustrative and not in a limiting sense.

It also to be understood that the following claims are intended to cover all the generic and specific features of the invention herein described and all statements of the scope of the invention which, as a matter of language might be said to fall therebetween.

What is claimed is:

1. A sled suit for sliding, comprising: a torso portion having an opening, a pair of sleeves coupled to said torso portion, a leg portion coupled to said torso portion; said torso portion, pair of sleeves and said leg portion each being made of durable waterproof material having a low coefficient of friction, said torso portion being formed of a first piece of material and at least one sleeve is made of a second material, said first material abutting said second material to form a seam between said sleeve and said torso portion, a first flap extending from said first material about a first fold line, a second flap extending from said second material about a second fold line, said first material being affixed to said second material at said first and second fold lines, said first flap being affixed to said first material and said second flap being affixed to said second material, a reinforcing material disposed over said seam and being attached to said sleeve and said torso portion.

2. The sled suit of claim 1, wherein said reinforcing fabric is tapered.

3. The sled suit of claim 1, wherein said first fold line is connected to said second fold line by an interconnecting stitch, at least said first flap is attached to said first material by a secondary stitch, and said reinforcing material being attached over said seam by an overstitch.

4. The sled suit of claim 1, further comprising a pouch affixed to a seat of said leg portion for selectively receiving a padded cushion thereon.

5. The sled suit of claim 2, further comprising an inflatable pad disposed within said sled suit at a position adjacent to the seat of the user, a tube disposed within said sled suit for inflating said inflatable pad and extending from said inflatable pad to a position adjacent the collar.

6. A sled suit for sliding, comprising: a torso portion having an opening, a pair of sleeves coupled to said torso portion, a leg portion coupled to said torso portion; said torso portion, pair of sleeves and said leg portion each being made of durable waterproof material having a low coefficient of friction; and a detachable boot detachably attached to a lower end of said leg portion, said boot including an opening edge provided on an upper part of said boot, said opening edge being provided with a fastening means for selectively opening and closing said opening edge.

7. A sled suit for sliding, comprising: a torso portion having an opening, a pair of sleeves coupled to said torso portion, a leg portion coupled to said torso portion; said torso portion, pair of sleeves and said leg portion each being made of durable waterproof material having a low coefficient of friction, said torso portion and leg portion being formed of a front part and a rear part respectively, said front part abutting said rear part to form a seam between said front part and said rear part of respective portions, a first flap extending from said front part about a first fold line, a second flap extending from said rear part about a second fold line, said front part being affixed to said rear part at said first and second fold lines, said first flap being affixed to said front part and said second flap being affixed to said rear part, a reinforcing material disposed over said seam and being attached to said front part and rear part of said torso portion and said leg portion.

8. A sled suit for sliding, comprising: a torso portion having an opening, a pair of sleeves coupled to said torso portion, a leg portion coupled to said torso portion; said torso portion, pair of sleeves and said leg portion each being made of durable waterproof material having a low coefficient of friction and each sleeve of said pair of sleeves being formed of a piece of material having a first portion and a second portion at opposing sides of said material, said first edge of material abutting said second edge of material to form a seam between said first edge and said second edge of material, a first flap extending from said first portion of material about a first fold line, a second flap extending from said second portion of material about a second fold line, said first portion of material being affixed to said second portion of material at said first and second fold lines, said first flap being affixed to said first portion and said second flap being affixed to said second portion, a reinforcing material disposed over said seam and being attached to said first and said second portions of material.

\* \* \* \* \*